US007526072B2

(12) United States Patent  
Haas

(10) Patent No.: US 7,526,072 B2
(45) Date of Patent: Apr. 28, 2009

(54) AUDIO DEVICE, SYSTEM AND METHOD FOR ARCHIVING AUDIO FILES BASED ON DISTRIBUTED AUDIO PHONE DATA RECEIVED OVER A DATA NETWORK IN ENCRYPTED OR NON-ENCRYPTED FORM

(75) Inventor: Bruno Haas, Lile Perrot (CA)

(73) Assignee: Orec LLC, Chicago, IL (US)

( * ) Notice: Subject to any disclaimer, the term of this patent is extended or adjusted under 35 U.S.C. 154(b) by 338 days.

(21) Appl. No.: 11/330,454

(22) Filed: Jan. 12, 2006

(65) Prior Publication Data

US 2007/0160084 A1 Jul. 12, 2007

(51) Int. Cl.
*H04M 11/00* (2006.01)
*H04J 3/16* (2006.01)
*H04J 3/22* (2006.01)
*H04L 12/66* (2006.01)

(52) U.S. Cl. ............... 379/88.16; 370/352; 370/466
(58) Field of Classification Search ............. 379/67.1, 379/68, 88.16, 88.25; 370/260, 261, 351–356; 713/153, 193

See application file for complete search history.

(56) References Cited

U.S. PATENT DOCUMENTS

| | | | |
|---|---|---|---|
| RE35,184 E | 3/1996 | Walker | |
| 5,627,819 A | 5/1997 | Dev et al. | |
| 5,940,376 A | 8/1999 | Yanacek et al. | |
| 6,026,442 A | 2/2000 | Lewis et al. | |
| 6,561,908 B1 | 5/2003 | Hoke | |
| 6,718,013 B2 | 4/2004 | Turner et al. | |
| 6,751,297 B2 | 6/2004 | Nelkenbaum | |
| 6,928,421 B2 | 8/2005 | Craig et al. | |
| 6,937,572 B1 | 8/2005 | Egan et al. | |
| 6,970,823 B1 | 11/2005 | Yago et al. | |
| 2003/0115451 A1* | 6/2003 | Walker et al. | 713/153 |
| 2004/0047451 A1* | 3/2004 | Barker et al. | 379/67.1 |
| 2004/0131161 A1* | 7/2004 | Schwartz et al. | 379/68 |
| 2004/0190691 A1* | 9/2004 | Schoeman | 379/88.16 |
| 2007/0130229 A1* | 6/2007 | Anglin et al. | 707/204 |

OTHER PUBLICATIONS

"Description of Voice Over IP Call Recording Methods Known Before Jan. 12, 2006," by Bruno Haas.
Howstuffworks "How VoIP Works," by Jeff Tyson and Robert Valdes [online] [retrieved from the Internet Dec. 30, 2005] <URL: http://computer.howstuffworks.com/ip-telephony.htm/printable>.
"Internet Telephony Feature Article: VoIP Call Recording Goes Mainstream," [online] [retrieved from the Internet Jan. 5, 2006] <URL:http://www.tmcnet.com/voip/1104/FeatureTelrex.htm>.

(Continued)

*Primary Examiner*—Ahmad F Matar
*Assistant Examiner*—Sonia Gay
(74) *Attorney, Agent, or Firm*—Bell, Boyd & Lloyd LLP

(57) ABSTRACT

An audio unit or audio system usable by a processor to: receive audio phone data over a data network; store at least one portion of the audio phone data in a non-encrypted form; and transmit at least one portion of the stored audio phone data to another data storage device which is coupled to the data network.

20 Claims, 5 Drawing Sheets

OTHER PUBLICATIONS

"Realtime Audio on the Internet," by Kenneth Lee and Woong-kyo Suh, Dec. 9, 1996 [online] [retrieved from the Internet Jan. 3, 2006] <URL:http://www.seas.upenn.edu/~ksl/Classes/TCOM500/Internet Audio/>.

"VoIP HowTo "How VoIP Works" Voice over IP and IP Telephony: References," [online] [retrieved from the Internet Dec. 30, 2005] <URL:http://voip-forum.tmcnet.com/voip-forum/forum/voip/VoIP-FAQ.html>.

* cited by examiner

AUDIO DEVICE, SYSTEM AND METHOD FOR ARCHIVING AUDIO FILES BASED ON DISTRIBUTED AUDIO PHONE DATA RECEIVED OVER A DATA NETWORK IN ENCRYPTED OR NON-ENCRYPTED FORM

BACKGROUND

The Internet enables people to view webpages, exchange email, play videos and also conduct phone communications. In Internet-based phone communications, the phone audio phone data has a packet form which is suitable for transmission over the Internet. IP-enabled private branch exchanges (IP PBXes) and voice over Internet protocol (VoIP) endpoints typically encrypt these data packets passing through them to prevent anyone except the intended recipient from accessing the data packets.

Some companies record or monitor Internet-based phone calls for business purposes, and some companies use voice mail systems to store Internet-based phone messages. To accomplish this, packet sniffers are used to monitor, analyze, capture or access the data packets associated with these Internet-based phone calls. The known packet sniffers are installed at a centralized location such as, for example, at the network switch or router of a local area network. These packet sniffers require that the packets be decrypted before the phone data can be recorded, monitored or stored in voice mail systems. With the periodic changes in encryption techniques, and the fact that encryption key retrieval from the various phone systems is a non-standard operation that is sometimes not possible at all, it is difficult to develop a reliable decryption system for the packet sniffers. Therefore, there is a need to overcome the disadvantages described above or otherwise lessen the effects of such disadvantages.

DETAILED DESCRIPTION

1. Distributed Architecture

The audio system, described further below, includes a plurality of audio modules or audio units. Each audio unit is installed on a separate networked device, such as work station or personal computer of a facility. Accordingly, in one example, the audio system is a distributed system in which the audio units are distributed throughout five hundred network-connected computers of a facility, and the audio units operate independently and locally on such computers. The computers of the facility are coupled to at least one server of a local area network (LAN) or other suitable network. In one example, when a person makes a phone call to a designated computer over the Internet, the server of the LAN transmits the audio phone data to the designated computer The audio unit, installed locally on the designated computer, captures and stores the audio phone data in a memory device of the audio subsystem of the designated computer. If the audio phone data is encrypted, the designated computer decrypts the audio stream prior to presenting it to the audio subsystem of the designated computer, where the decrypted phone data is captured. Accordingly, in this example, the non-encrypted audio phone data is distributed and stored locally in the data storage devices or sound subsystems of the facility's five hundred networked-connected computers. When a designated event occurs with respect to a designated computer, the audio unit installed on the designated computer extracts the non-encrypted audio phone data to from the designated computer and transmits the extracted audio phone data to a centralized audio archiver device, which, in turn, stores the audio phone data in a centralized voice mail database accessible to end users. Thus, the audio system, through the distributed audio units, bypasses or lessens the effects of encryption problems.

2. Electronic Configuration

Figure 1:
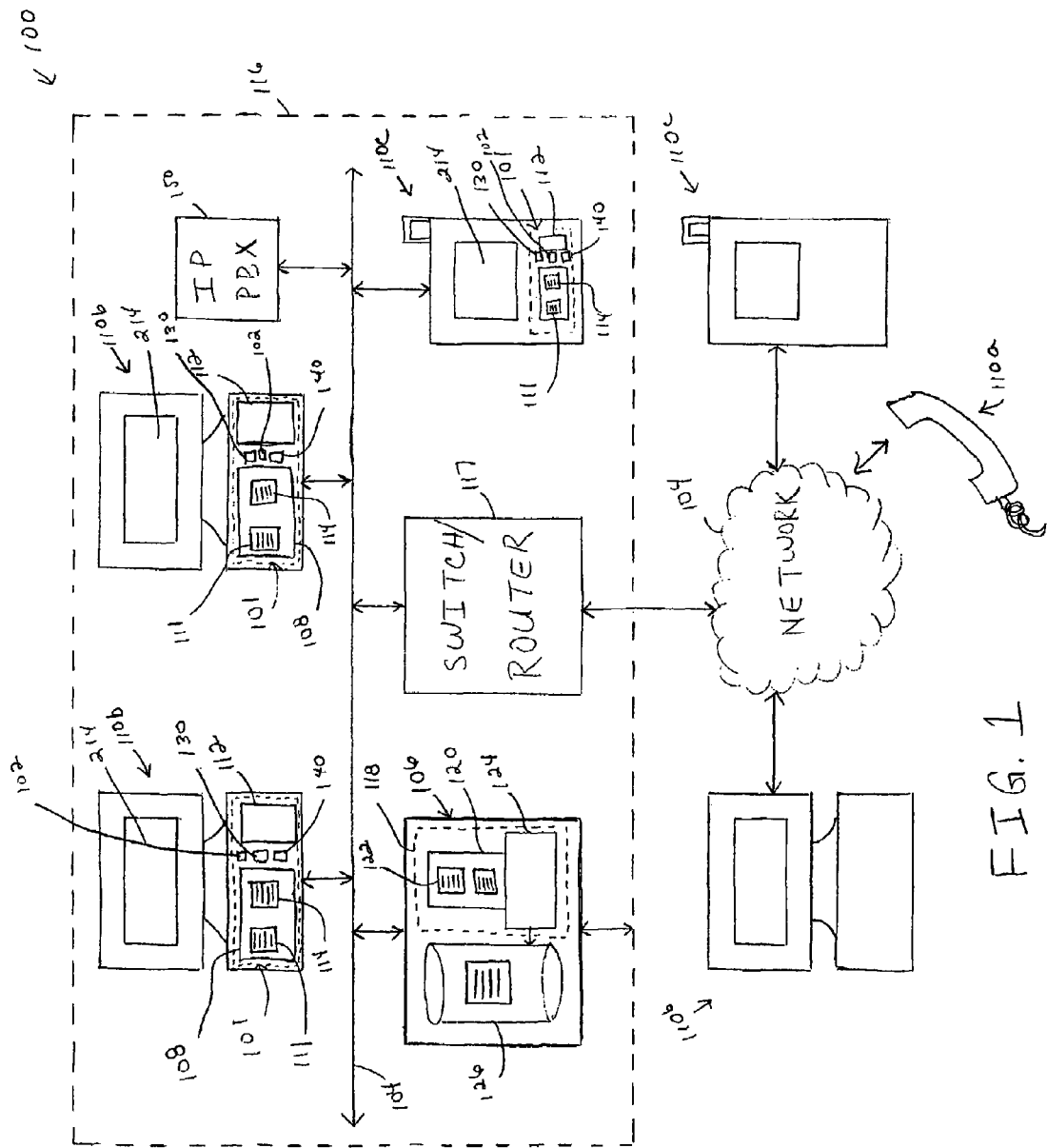
FIG. 1 is a block diagram of one embodiment of a system for receiving and transmitting non-encrypted audio phone data over a data network, including a communication device, an audio accessor, and an audio archiver device.

Referring to the embodiment of FIG. 1, an audio system 100 for receiving and transmitting non-encrypted audio phone data includes: (a) a plurality of audio systems, modules or units 101 separately distributed, installed and stored on a plurality of networked devices 110; and; and (b) an audio archiver device 106 coupled to the audio units 101 over a transmission medium, data network or network connection 104.

In one embodiment, each one of the distributed audio units 101 has: (a) an audio receiver 130 that receives audio phone data, in an encrypted or non-encrypted format; (b) a translator or decrypter 140 which enables the networked device 110 to read any of the audio phone data that is encrypted; and (c) an audio accessor 102 that enables access to the non-encrypted audio phone data and enables the non-encrypted audio phone data to be stored by the audio archiver device 106.

Figure 3:
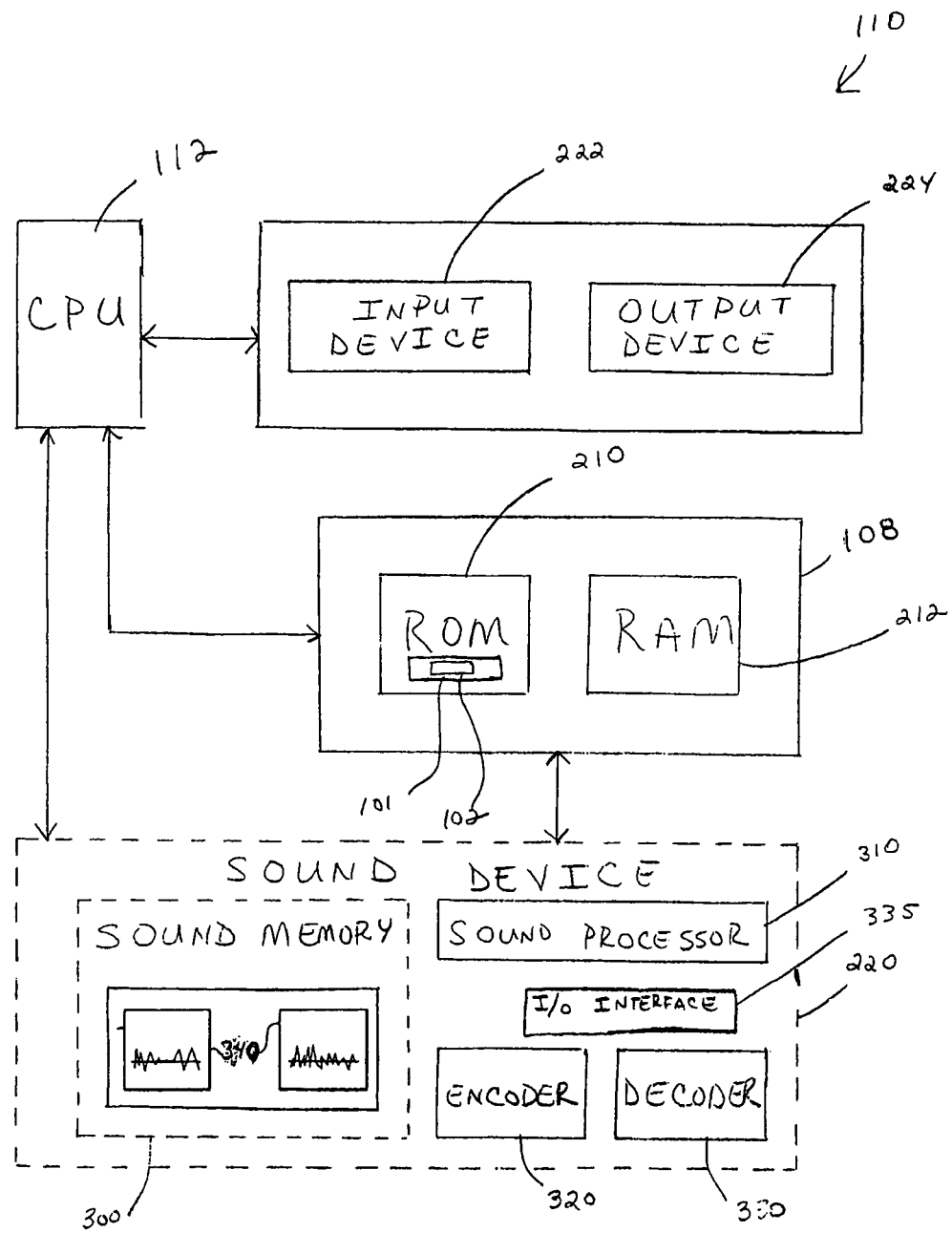
FIG. 3 is a block diagram of one embodiment of a sound device of the communication device.

Each one of the distributed audio units 101 can be implemented as a software program or routine stored in a memory device 108 of a communication device or networked device 110 and can include a plurality of audio accessor instructions 111. Referring to FIG. 3, a central processing unit (CPU) or processor 112 of the networked device 110 executes the audio accessor instructions 111 to perform the following functions: (i) to receive audio phone data 114 (in encrypted or non-encrypted form) over the network connection 104; (ii) to store the received audio phone data 114 in the memory device 108 in a non-encrypted form; and (iii) to transmit at least one portion of the non-encrypted audio phone data 114 to the audio archiver device 106 over the network connection 104.

The non-encrypted audio phone data 114 can be associated with any suitable network communication occurring over the network connection 104. In one embodiment, the network communication can include a real-time audio communication such as, for example, a real-time telephone conversation. Alternatively or in addition, the network communication can include a recorded audio communication such as, for example, a voice mail recording or a computer-generated recording. Depending upon the form of the audio phone data received by the audio receiver 130, the audio phone data 114 stored in the memory device 108 can include decrypted format or decrypted phone data; converted format or converted phone data; or original format or original phone data. In each case, the phone data 114 has a non-encrypted form suitable for use and reading without requiring any additional decryption.

The network connection 104 can include any suitable communication network capable of transmitting audio phone data in discrete digitized packets such as, for example, a local area network (LAN) or a wide area network (WAN), each of which can be associated with a business or corporate enterprise 116. Alternatively, or in addition, the network connection 104 can include the Internet, a wireless network, or any suitable packet-switched network. As shown in the embodiment of FIG. 1, the business or private enterprise 116 can include a network switch or router 117 configured to route or direct data over the LAN or WAN from a source to a destination. If desired, the switch or router 117 may be further configured to encrypt certain data and decrypt certain data traveling over the LAN or WAN within the business or private enterprise 116 in accordance with the enterprise's operating procedures. The business or private enterprise 116 can further include an IP or IP-enabled private branch exchange (PBX) 150 that can communicate packetized voice data over the in-house LAN or WAN.

Referring back to FIG. 1, the audio archiver device 106, in one embodiment, includes an audio archiver computer or server 118 having an audio archiver processor 120 which manages voice mail storage and access. In accordance with the audio archiver instructions 122 stored in an audio archiver memory device 124, the audio processor 120 stores audio phone data in the data storage device 126 of the audio archiver device 106. In one embodiment, the data storage device 126 includes one or more databases such as, for example, a structured query language (SQL) database. The operation of the audio archiver device 106 will be described in greater detail below.

As shown in the embodiment of FIG. 1, the networked device 110 can include: (a) a wire-based phone 110a connected to phone wires through a plurality of circuit switches or the network commonly known as Public Switched Telephone Network (PSTN); (b) a work station or personal computer 110b; or (c) a wireless device 110c (for example, a mobile telephone or personal digital assistant), each of which is operable based on a suitable voice-based digital communication protocol. The VoIP digital communication protocol enables the phone 110a, computer 110b and wireless device 110c to transmit and receive audio phone data 114 from another networked device 110 in discrete digitized packets over the network connection 104. In one embodiment, the wire-based phone 110a has an analog telephone adapter (ATA) to enable the phone 110a to be used with a digital communication protocol.

Alternatively or in addition, the networked device 110 can include an Internet Protocol (IP) telephone using any desired protocol capable of implementing VoIP such as, for example, H.323, H.248, session initiation protocol (SIP) and skinny client control protocol (SCCP). It should be appreciated that the networked device 110 can include any electronic device which has a suitable two-way communication module.

Figure 2:
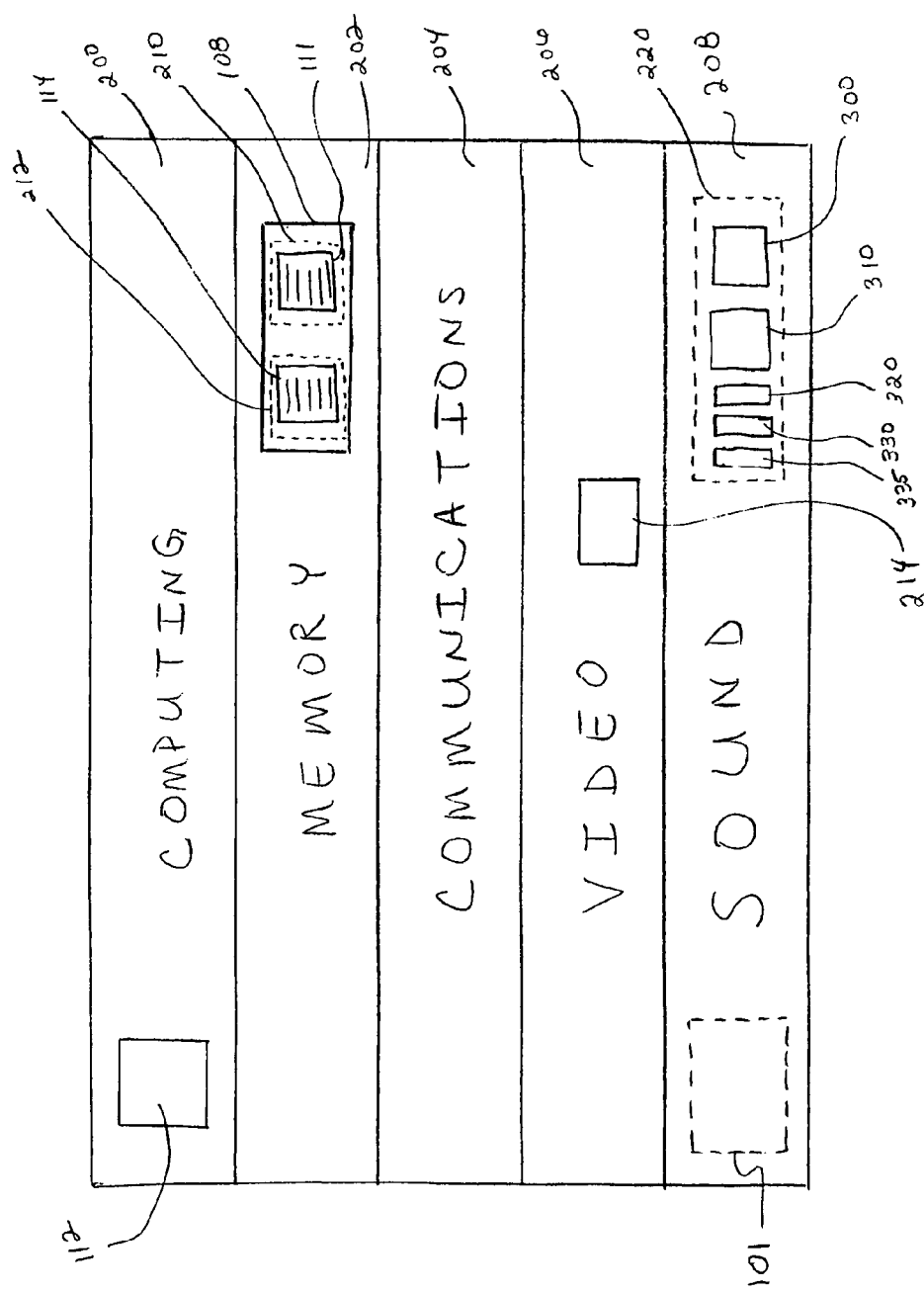
FIG. 2 is a block diagram of one embodiment of various subsystems associated with the communication device.

Referring to FIG. 2, one embodiment of various subsystems associated with an exemplary networked computer 110b is shown. As shown in the embodiment of FIG. 2, the networked computer 110b can include a computing subsystem 200, a memory subsystem 202, a communications subsystem 204, a video subsystem 206 and a sound subsystem 208.

The computing subsystem 200 can include the processor 112 and any other suitable components to control the mathematical, logic and instructional processing of the networked device 110. Because the processor 112 functions as the brains of the networked device 110, the processor 112 is configured to be in communication with the various components of the memory subsystem 202, the communications subsystem 204, the video subsystem 206 and the sound subsystem 208.

The memory subsystem 202, in one embodiment, includes the memory device 108 to store instructions and data associated with the networked device 110. In one embodiment, the memory device 108 includes a read-only memory (ROM) 210 and a random access memory (RAM) 212. The ROM 210 includes the accessor instructions 111, and the RAM 212 includes the non-encrypted audio phone data 114 described above. It should be understood that the memory subsystem 202 can include other types of suitable memory devices.

The communications subsystem 204 provides the computing subsystem 200 with functionality to receive and transmit audio phone data over the network connection 104. For example, the communications subsystem 208 can be configured: (i) to select between different communication protocols; (ii) to establish connectivity to the network connection 104; and (iii) to provide "hand-off" functions between various zones or networks. It should be understood that the personal computer 106 can include other subsystems in addition to or in place of those shown in the embodiment of FIG. 2.

The video subsystem 206 includes a video card or device (not shown) configured to display information on a video display or monitor 214 of the networked device 110. The sound subsystem 208 includes a sound card or device 220 configured to translate or convert analog audio phone data into a digital, computer-usable format. In one embodiment illustrated in FIG. 2, the sound device 220 of each one of the networked devices 110 includes the audio unit 101, and the audio unit 101 directs the processor 112 to perform the following functions: (i) to receive audio phone data from a LAN server or an input device 222 (for example, a microphone) of the networked device 110; (ii) to store the received phone data as audio phone data 114 in a non-encrypted form; (iii) to manipulate the non-encrypted audio phone data 114 (for example, encode or decode the non-encrypted audio phone data 114); (iii) to transmit the non-encrypted stored audio phone data to the archiver device 106 when a designated event occurs; and (iv) to transmit the non-encrypted audio phone data 114 to an output device 224 (for example, a speaker) of the networked device 110 when a different designated event occurs. The sound device 220 can also be configured to create audio phone data, if desired.

Referring to FIG. 3, one embodiment of the sound device 220 of the networked device 110 is shown. As shown, the sound device 220 includes: (a) a sound memory 300 such as, for example, a sound RAM; (b) a sound processor 310 which accesses the sound memory 300; (c) an encoder 320; (d) a decoder 330 and (e) an input/output (I/O) interface 335. The sound processor 310 of the sound device 220 uses the encoder to sample or convert analog audio phone data into a digitized format, which can be stored in the sound memory 300 as one or more digital sound files 340. Alternatively, the sound device 220 can receive data in a digital format. In one embodiment, digitized audio phone data is stored in the sound files 340 in a digital Waveform Audio (WAV) format, Audio Format (AU) format, QuickTime (MOV) format, Audio Interchange File Format (AIFF), or any other suitable format. Alternatively or in addition, the digitized audio phone data can be stored in the memory device 108 or any other suitable storage device.

In one embodiment, the encoder 320 of the sound device 220 directs the processor 310 to encode or convert digitized audio phone data into compressed digitized packets for efficient transmission over the network connection 104. The decoder 330 of the sound device 220 directs the processor 310 to decompress or decode the digitized packets for the purpose of generating sound.

Although the sound device 220 has been described as including a sound memory 300 and a sound processor 310 that is separate and distinct from the memory device 108 and the processor 112 of the networked device 110 to, for example, provide faster processing, it is to be understood that the functionality of the sound memory 300 can be performed by the memory device 108, and the functionality of the sound processor 310 can be performed by the processor 112, if desired. Further, although the encoder 320 and the decoder 330 are shown as separate devices in FIG. 3, it is to be understood that the functionalities of both of the encoder 320 and the decoder 330 may be performed in a single device such as, for example, a codec., if desired.

In one embodiment, the audio accessor 102 directs the processor 112 to transmit at least one portion of the non-encrypted audio phone data 114 to the audio archiver device 106 according to a streaming protocol such as, for example, the protocol which is commercially available under the REALAUDIO™ trademark. During the streaming operation, the processor 112 (as directed by the accessor 102) breaks up the non-encrypted audio phone data 114 into small chunks or packets, and transmits each packet individually to the audio archiver device 106 over the network connection 104 at a designated rate. In this manner, the audio archiver device 106 does not have to receive all of the packets of non-encrypted audio phone data 114 before processing the packets, but can begin processing the packets of non-encrypted audio phone data 114 after only receiving one or more of these packets.

In one embodiment, the processor 112 of the networked device 110 executes the audio accessor instructions 111 to determine the start event associated with a network communication, for example, by monitoring or polling traffic over the network connection 104. In response to the start event of the network communication, the processor 112 executes the accessor instructions 111 to transmit a communication start indication or signal to the audio archiver device 106 over the network connection 104. In one embodiment, the processor 112 simultaneously transmits non-encrypted audio phone data 114 to the archiver device 106.

Upon receipt of the start signal and packets of non-encrypted audio phone data 114 from the networked device 110, the audio archiver processor 120 executes the accessor instructions 111 to reassemble, decode, and/or decompress the portion of packets of non-encrypted audio phone data 114 into the appropriate sequence to resemble the original form of the non-encrypted audio phone data. Thereafter, the audio archiver processor 120 executes the accessor instructions 111 to store the non-encrypted audio phone data 114 in the audio archiver memory device 124 and/or the data storage device 126 for access by voice mail users over the LAN. If desired, the audio archiver processor 120 can execute the audio archiver instructions 122 to encrypt the non-encrypted audio phone data 114. In this manner, the audio phone data can be secured or protected from hacking or eavesdropping.

The non-encrypted audio phone data 114 can include audio indicia 350 (for example, the digitized audio signals) and network indicia 352 (for example, metadata associated with the network communication). In one embodiment, the audio archiver processor 120 executes the audio archiver instructions 122 to store the audio indicia 350 in the audio archiver memory device 124 and to store the network indicia 352 in the data storage device 126 or vice versa.

In one embodiment, the processor 112 of the networked device 110 executes the plurality of audio accessor instructions 111 to determine an end event of a network communication by monitoring or polling the traffic over the network connection 104. In response to the end of the network communication, the processor 112 executes the accessor instructions 111 to transmit a communication end indication or signal to the audio archiver device 106 over the network connection 104, and to stop transmitting the non-encrypted audio phone data 114 to the audio archiver device 106 over the network connection 104.

3. Method

Figure 4:
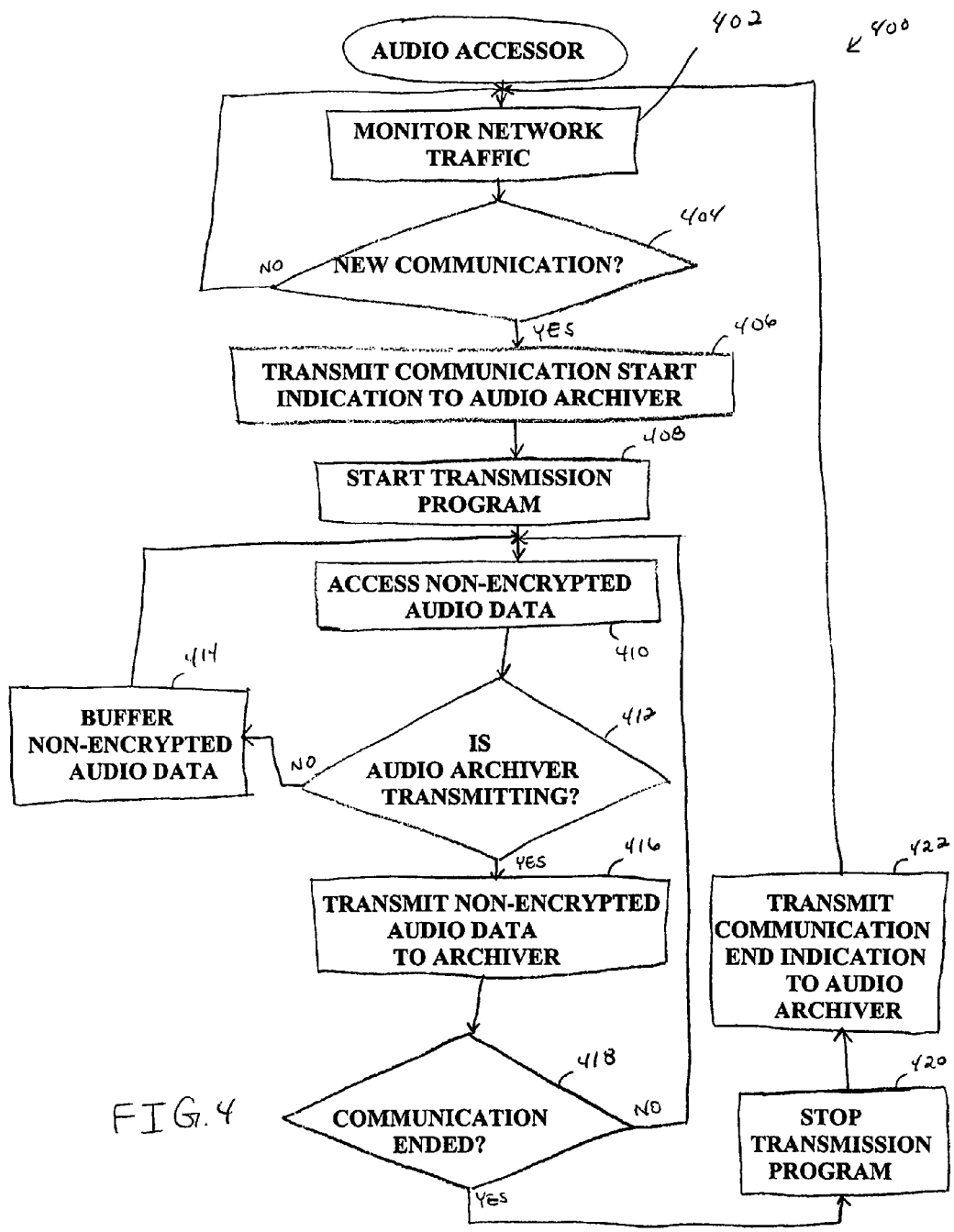
FIG. 4 is a flowchart of one embodiment of an audio accessing method of the audio accessor.

In one embodiment, illustrated in FIG. 4, at block 402, the processor 112 of the networked device 110 executes the accessor instructions 111 to monitor network traffic by, for example, sampling or polling the network connection 104, as indicated by block 402. At decision block 404, the processor 112 of the networked device executes the accessor instructions 111 to determine whether a new communication such as, for example, a voice over Internet protocol (VoIP) telephone call, has occurred over the network connection 104. For example, the processor 112 of the networked device 110 can execute the accessor instructions 111 to determine whether a new communication has started over the network connection 104. If the processor 112 of the networked device 110 determines that a new communication has started, the processor 112 of the networked device 110 executes the accessor instructions 111 to transmit a communication start indication or signal to the audio archiver device 106 at block 406.

At block 408, the processor 112 of the networked device 110 executes the accessor instructions 111 to start a suitable transmission or streaming process or routine. At block 410, the processor 112 of the networked device 110 executes the accessor instructions 111 to capture or access a portion of the non-encrypted audio phone data 114 from a storage area of the networked device 110 such as, for example, the memory device 108 or the sound memory 300.

At decision block 412, the processor 112 of the networked device 110 executes the accessor instructions 111 to determine whether the audio archiver device 106 is transmitting or streaming audio phone data. If the processor 112 of the networked device 110 determines that the audio archiver device 106 is not transmitting or streaming data at block 412, the processor 112 executes the accessor instructions 111 to buffer the portion of accessed or captured non-encrypted audio phone data 114 in a designated storage area of the networked device as indicated by block 414. The designated storage area can include the memory device 108 or the sound memory 300. Thereafter, control passes back to block 410 in which the processor 112 of the networked device 110 executes the accessor instructions 111 to capture or access another portion of the non-encrypted audio phone data 114 from the networked device 110.

If the processor 112 of the networked device 110 determines that the audio archiver device 106 is transmitting or streaming at block 412, control passes to block 416 in which the processor 112 of the networked device 110 executes the plurality of accessor instructions 111 to transmit or stream the captured or accessed portion of non-encrypted audio phone data 114 to the audio archiver device 106.

At decision block 418, the processor 112 of the networked device 110 executes the audio accessor instructions 111 to determine whether the communication has ended or terminated by monitoring or polling the traffic over the network connection 104. If the processor 112 of the networked device 110 determines that the network communication has ended or terminated at block 418, control passes to block 420 in which the processor 112 of the networked device 110 executes the plurality of audio accessor instructions 111 to stop the transmission or streaming process or routine. At block 422, the processor 112 of the networked device 110 executes the accessor instructions 111 to transmit a communication end indication or signal to the audio archiver device 106 over the network connection 104.

If the processor 112 of the networked device 110 determines that the audio archiver device 106 is not transmitting or streaming at block 412, control passes back to block 410 in which the processor 112 of the networked device 110 executes the plurality of accessor instructions 111 to capture or access another portion of the non-encrypted audio phone data 114 from the networked device 110.

Figure 5:
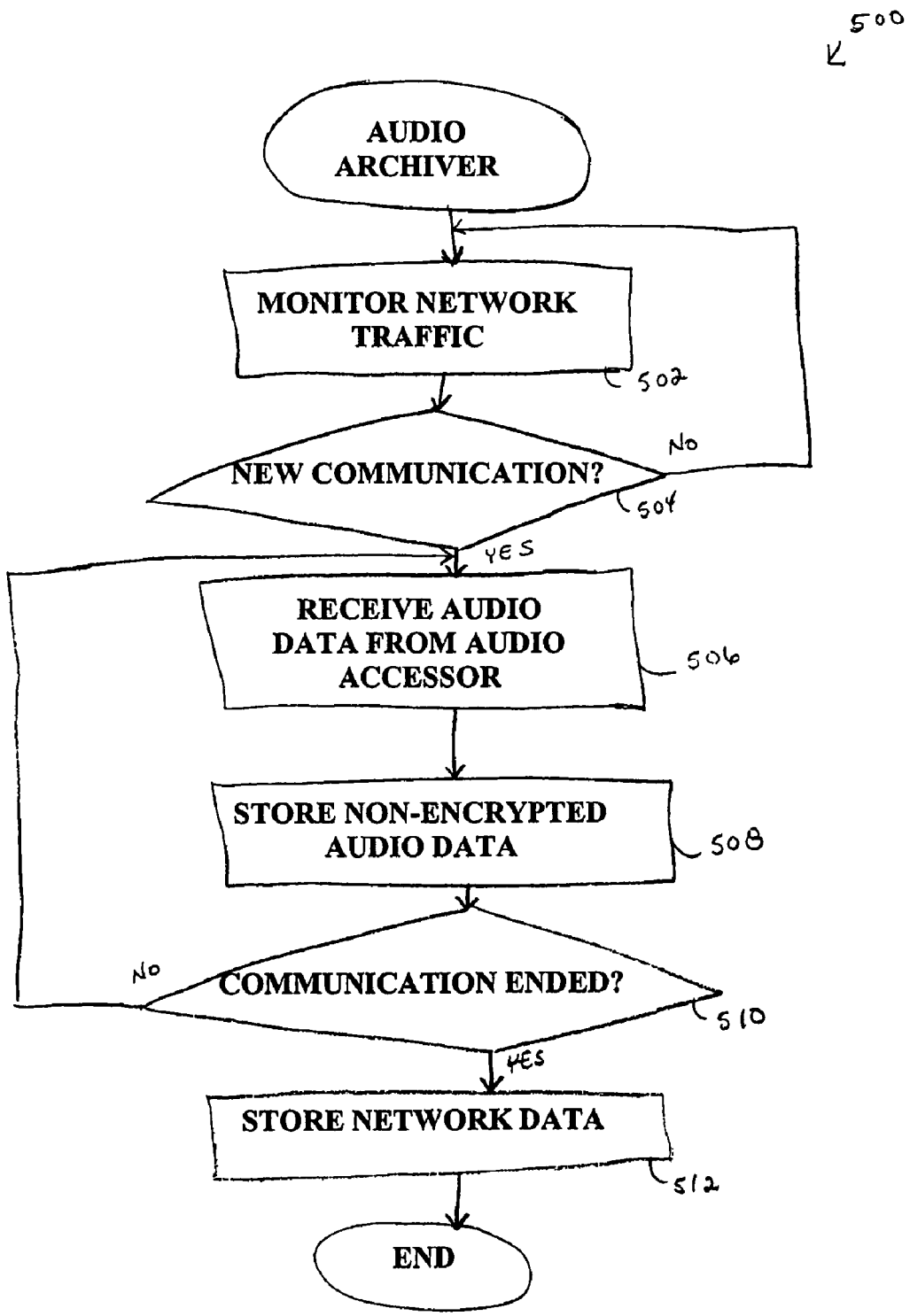
FIG. 5 is a flowchart of one embodiment of an audio archiving method of the audio archiver device.

Referring to FIG. 5, a flowchart of one embodiment of an audio archiving method 500 of the audio archiver device 106 is illustrated. At block 502, the audio archiver processor 120 of the audio archiver device 106 executes the audio archiver instructions 122 to monitor network traffic by, for example, sampling or polling the network connection 104. At decision block 504, the audio archiver processor 120 of the audio archiver device 106 executes the plurality of audio archiver instructions 122 to determine whether a new communication such as, for example, a voice over Internet protocol (VoIP) telephone call, has occurred over the network connection 104. For example, the audio archiver processor 120 of the audio archiver device 106 can execute the plurality of audio archiver instructions 122 to determine whether a communication start indication or signal from the networked device 110 has been received.

If the audio archiver processor 120 of the audio archiver device 106 determines that a new communication has not occurred at block 504, control passes back to block 502 in which the audio archiver processor 120 of the audio archiver device 106 can execute the audio archiver instructions 122 to monitor network traffic.

If the audio archiver processor 120 of the audio archiver device 106 determines that a new communication has occurred over the network connection 104 at block 504, control passes to block 506 in which the audio archiver processor 120 of the audio archiver device 106 executes the audio archiver instructions 122 to receive or stream down the portion or chunk of non-encrypted audio phone data 114 from the networked device 110 over the network connection 104.

At block 508, the audio archiver processor 120 of the audio archiver device 106 executes the audio archiver instructions 122 to store the portion or chunk of non-encrypted audio phone data 114 in the audio archiver memory device 124 and/or the data storage device 126. If desired, the audio archiver processor 120 can execute the plurality of audio archiver instructions 122 to encrypt the non-encrypted audio phone data 114. In this manner, the audio phone data can be secured or protected from hacking or eavesdropping.

At decision block 510, the audio archiver processor 120 of the audio archiver device 106 executes the plurality of audio archiver instructions 122 to determine whether the network communication has ended or terminated. For example, the audio archiver processor 120 of the audio archiver device 106 executes the plurality of audio archiver instructions 122 to determine whether a communication end indication or signal from the networked device 110 has been received.

If the audio archiver processor 120 of the audio archiver device 106 determines that the network communication has not ended or terminated at block 510, control passes back to block 506 in which the audio archiver processor 120 of the audio archiver device 106 executes the plurality of audio archiver instructions 122 to receive or stream down another portion or chunk of non-encrypted audio phone data 114 from the networked device 110 over the network connection 104.

If the audio archiver processor 120 of the audio archiver device 106 determines that the network communication has not ended or terminated at block 510, control passes to block 512 in which the audio archiver processor 120 of the audio archiver device 102 executes the audio archiver instructions to store network indicia 352 such as, for example, metadata associated with the network communication, in the audio archiver memory device 124 and/or the data storage device 126.

Although the audio accessor 102 has been described as being a software program implemented by the networked device 110, it is to be understood that the audio accessor 102 can, alternatively, include a hardware device that can be coupled to the networked device 110. Likewise, in one embodiment, the audio unit 101 includes suitable hardware and circuitry which enables the server 118 and processors 112 and 120 to have the functionality described above.

In one embodiment, the system 100 enables output data to be stored in non-encrypted form in the memory device 108 of each networked device 110. This non-encrypted output data can include, without limitation, audio data, visual data, video data and audio-visual (AV) data transmitted to the networked device 110 over a data network or communication channel. In this embodiment, the unit 101 processes this non-encrypted output data as if it were the audio phone data 114 described above.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system for facilitating an organization's archival of audio phone data, the system comprising:
    a computer-readable medium which stores a plurality of computer-readable instructions usable in conjunction with the audio phone data of the organization, the system being operable in conjunction with first and second computers of the organization, wherein:
    (a) the first computer is usable by a first computer user;
    (b) the second computer is usable by a second computer user; and
    (c) the organization is operable to receive first and second audio phone data sets over a network, wherein:
        (1) the first audio phone data set is associated with a first network communication protocol;
        (2) the first network communication protocol is associated with a first encryption protocol;
        (3) the first audio phone data set is receivable in a first encrypted form;
        (4) the first audio phone data set is associated with a first address;
        (5) the second audio phone data set is associated with a different, second network communication protocol;
        (6) the second network communication protocol is associated with a different, second encryption protocol;
        (7) the second audio phone data set is receivable in a different, second encrypted form;

(8) the second audio phone data set is associated with a different, second address;
(9) if the first audio phone data set is received:
  (i) the first audio phone data set is transmitted to the first computer, wherein:
    (•) the first computer is operatively coupled to the network;
    (•) the first computer has a first communication system and a first memory device;
    (•) the first computer is associated with the first address; and
    (•) the first audio phone data set remains in the first encrypted form during the transmission to the first computer;
  (ii) the first communication system of the first computer is operable to change the first audio phone data set from the first encrypted form to a non-encrypted form; and
  (iii) the first audio phone data set is stored in the first memory device, wherein the first audio phone data set is stored in the non-encrypted form;
(10) the computer-readable instructions are executable to:
  (i) access the first audio phone data set while the first audio phone data set is stored in the first memory device; and
  (ii) transmit the first audio phone data set to a database over the network, wherein the first audio phone data set remains in the non-encrypted form during the transmission to the database, wherein the first audio phone data set stored in the database is accessible to the first computer user;
(11) if the second audio phone data set is received:
  (i) the second audio phone data set is transmitted to a second computer, wherein:
    (•) the second computer is operatively coupled to the network;
    (•) the second computer has a second communication system and a second memory device;
    (•) the second computer is associated with the second address; and
    (•) the second audio phone data set remains in the second encrypted form during the transmission to the second computer;
  (ii) the second communication system of the second computer is operable to change the second audio phone data set from the second encrypted form to the non-encrypted form; and
  (iii) the second audio phone data set is stored in the second memory device, wherein the second audio phone data set is stored in the non-encrypted form;
(12) the computer-readable instructions are executable to:
  (i) access the second audio phone data set while the second audio phone data set is stored in the second memory device; and
  (ii) transmit the second audio phone data set to the database over the network, wherein the second audio phone data set remains in the non-encrypted form during the transmission to the database, wherein the second audio phone data set stored in the database is accessible to the second computer user.

2. The system of claim 1, wherein the first and the second audio phone data sets in the non-encrypted form comprise data selected from the group consisting of decrypted phone data, converted phone data, decoded phone data and original phone data.

3. The system of claim 1, wherein the transmission of the first and second audio phone data sets to the database are transmitted according to a streaming protocol.

4. The system of claim 1, wherein the transmission of the first and second audio phone data sets to the database are transmitted in digital packets.

5. The system of claim 1, wherein the transmission of the first and second audio phone data sets to the database are transmitted using Voice over Internet Protocol (VoIP) technology.

6. The system of claim 1, wherein the computer-readable instructions are executable to:
  (a) determine a start event of a network communication;
  (b) transmit a communication start indication to another processor over the data network in response to the start event;
  (c) determine an end event of the network communication; and
  (d) transmit a communication end indication to another processor over the data network in response to the end event.

7. The system of claim 6, wherein the computer-readable instructions are executable to:
  transmit the first and second non-encrypted audio phone data sets to the database in response to the communication start indication; and
  stop transmitting the first and second non-encrypted audio phone data sets to the database in response to the communication end indication.

8. The system of claim 1, wherein the computer-readable instructions are executable to the at least one portion of the first and second non-encrypted audio phone data sets during transmission to the database.

9. The system of claim 1, further comprising an input unit coupled to the first processor, wherein the input device sends the first and second audio phone data sets.

10. The system of claim 9, wherein the input unit comprises at least one of a microphone or a digital sound file stored within the first or second memory device.

11. The system of claim 1, wherein the transmission medium includes a network selected from the group consisting of a local area network, a wide area network, a packet-switched network, a wireless network, an Internet and an intranet.

12. The system of claim 1, wherein the plurality of audio phone data sets comprise at least one of a real-time audio communication or a recorded audio communication.

13. A set of computers including a first computer and a second computer of an organization, the computers being usable to facilitate the organization's archival of audio phone data, each one of the first and second computers comprising:
  at least one audio accessor, wherein:
    (a) the first computer is usable by a first computer user;
    (b) the second computer is usable by a second computer user: and
    (c) the organization is operable to receive first and second audio phone data sets over a network, wherein:
      (1) the first audio phone data set is associated with a first network communication protocol:
      (2) the first network communication protocol is associated with a first encryption protocol:

(3) the first audio phone data set is receivable in a first encrypted form;
(4) the first audio phone data set is associated with a first address
(5) the second audio phone data set is associated with a different, second network communication protocol;
(6) the second network communication protocol is associated with a different, second encryption protocol;
(7) the second audio phone data set is receivable in a different, second encrypted form;
(8) the second audio phone data set is associated with a different, second address:
(9) if the first audio phone data set is received:
  (i) the first audio phone data set is transmitted to the first computer, wherein:
    (•) the first computer is operatively coupled to the
    (•) the first computer has a first communication system and a first memory device;
    (•) the first computer is associated with the first address; and
    (•) the first audio phone data set remains in the first encrypted form during the transmission to the first computer;
  (ii) the first communication system of the first computer is operable to change the first audio phone data set from the first encrypted form to a non-encrypted form: and
  (iii) the first audio phone data set is stored in the first memory device, wherein the first audio phone data set is stored in the non-encrypted form:
(10) the at least one audio accessor has a plurality of computer- readable instructions which are executable to:
  (i) access the first audio phone data set while the first audio phone data set is stored in the first memory device: and
  (ii) transmit the first audio phone data set to a database over the network, wherein the first audio phone data set remains in the non-encrypted form during the transmission to the database, wherein the first audio phone data set stored in the database is accessible to the first computer user;
(11) if the second audio phone data set is received:
  (i) the second audio phone data set is transmitted to a second computer, wherein:
    (•) the second computer is operatively coupled to the network:
    (•) the second computer has a second communication system and a second memory device:
    (•) the second computer is associated with the second address: and
    (•) the second audio phone data set remains in the second encrypted form during the transmission to the second computer:
  (ii) the second communication system of the second computer is operable to change the second audio phone data set from the second encrypted form to the non-encrypted form: and
  (iii) the second audio phone data set is stored in the second memory device, wherein the second audio phone data set is stored in the non-encrypted form:
(12) the at least one audio accessor has a plurality of computer-readable instructions which are executable to:
  (i) access the second audio phone data set while the second audio phone data set is stored in the second memory device: and
  (ii) transmit the second audio phone data set to the database over the network, wherein the second audio phone data set remains in the non-encrypted form during the transmission to the database, wherein the second audio phone data set stored in the database is accessible to the second computer user.

14. The set of computers of claim 13, wherein each one of the first and second computers includes a device selected from the group consisting of a personal computer, a telephone module, an Internet Protocol (IP) telephone module and a wireless device.

15. The set of computers of claim 13, wherein the audio phone data set in the non-encrypted form comprises data selected from the group consisting of decrypted data, converted data, decoded data and original data.

16. The set of computers of claim 15, wherein when executed by the at least one processor, the plurality of instructions cause the at least one processor to non-encrypted audio phone data to the database according to a streaming protocol.

17. The set of computers of claim 15, wherein the computer-readable instructions are executable to transmit non-encrypted audio phone data to the database in digital packets.

18. The set of computers of claim 17, wherein the computer-readable instructions are executable to transmit the non-encrypted audio phone data to the database using Voice over Internet Protocol (VoIP).

19. A method for facilitating an organization's archival of audio phone data, the method comprising:
  enabling the organization to operate at least one audio accessor in conjunction with first and second computers of the organization, wherein:
    (a) the first computer is usable by a first computer user;
    (b) the second computer is usable by a second computer user; and
    (c) the organization is operable to receive first and second audio phone data sets over a network wherein:
      (1) the first audio phone data set is associated with a first network communication protocol;
      (2) the first network communication protocol is associated with a first encryption protocol;
      (3) the first audio phone data set is receivable in a first encrypted form;
      (4) the first audio phone data set is associated with a first address;
      (5) the second audio phone data set is associated with a different, second network communication protocol;
      (6) the second network communication protocol is associated with a different, second encryption protocol;
      (7) the second audio phone data set is receivable in a different, second encrypted form;
      (8) the second audio phone data set is associated with a different, second address;
      (9) if the first audio phone data set is received:
        (i) the first audio phone data set is transmitted to the first computer, wherein:
          (•) the first computer is operatively coupled to the network;

(•) the first computer has a first communication system and a first memory device;
(•) the first computer is associated with the first address; and
(•) the first audio phone data set remains in the first encrypted form during the transmission to the first computer;

(ii) the first communication system of the first computer is operable to change the first audio phone data set from the first encrypted form to a non-encrypted form; and (iii) the first audio phone data set is stored in the first memory device, wherein the first audio phone data set is stored in the non-encrypted form;

(10) the at least one audio accessor is operable to:
  (i) access the first audio phone data set while the first audio phone data set is stored in the first memory device; and
  (ii) transmit the first audio phone data set to a database over the network, wherein the first audio phone data set remains in the non-encrypted form during the transmission to the database, wherein the first audio phone data set stored in the database is accessible to the first computer user;

(11) if the second audio phone data set is received:
  (i) the second audio phone data set is transmitted to a second computer, wherein:
    (•) the second computer is operatively coupled to the network:
    (•) the second computer has a second communication system and a second memory device;
    (•) the second computer is associated with the second address; and
    (•) the second audio phone data set remains in the second encrypted form during the transmission to the second computer;

(ii) the second communication system of the second computer is operable to change the second audio phone data set from the second encrypted form to the non-encrypted form; and (iii) the second audio phone data set is stored in the second memory device, wherein the second audio phone data set is stored in the non-encrypted form;

(12) the at least one audio accessor is operable to:
  (i) access the second audio phone data set while the second audio phone data set is stored in the second memory device; and
  (ii) transmit the second audio phone data set to the database over the network, wherein the second audio phone data set remains in the non-encrypted form during the transmission to the database, wherein the second audio phone data set stored in the database is accessible to the second computer user.

20. The method of claim 19, further comprising: transmitting the first and second audio phone data sets to the database using Voice over Internet Protocol (VoIP).

\* \* \* \* \*